(12) United States Patent
Baudhuin (10) Patent No.: US 12,503,660 B2
(45) Date of Patent: Dec. 23, 2025

(54) SUPERCRITICAL WATER GASIFICATION PROCESS

(71) Applicant: Thomas J. Baudhuin, Canton, GA (US)

(72) Inventor: Thomas J. Baudhuin, Canton, GA (US)

( * ) Notice: Subject to any disclaimer, the term of this patent is extended or adjusted under 35 U.S.C. 154(b) by 0 days.

(21) Appl. No.: 17/636,274

(22) PCT Filed: Aug. 20, 2020

(86) PCT No.: PCT/US2020/047198
§ 371 (c)(1),
(2) Date: Feb. 17, 2022

(87) PCT Pub. No.: WO2021/035052
PCT Pub. Date: Feb. 25, 2021

(65) Prior Publication Data
US 2022/0290064 A1   Sep. 15, 2022

Related U.S. Application Data

(60) Provisional application No. 62/889,716, filed on Aug. 21, 2019.

(51) Int. Cl.
*C10J 3/78*   (2006.01)
(52) U.S. Cl.
CPC ......... *C10J 3/78* (2013.01); *C10J 2300/0903* (2013.01); *C10J 2300/0916* (2013.01);
(Continued)

(58) Field of Classification Search
CPC ........ C10J 2300/0916; C10J 2300/0979; C10J 2300/1884; C10J 2300/1892; C10J 3/86;
(Continued)

(56) References Cited

U.S. PATENT DOCUMENTS

| 4,017,271 A | 4/1977 | Barclay et al. |
| 4,199,545 A | 4/1980 | Matovich |

(Continued)

FOREIGN PATENT DOCUMENTS

| CN | 104152166 B | * | 5/2016 |
| CN | 106010662 A | | 10/2016 |

(Continued)

OTHER PUBLICATIONS

Machine Translation of CN-106244241-B (Year: 2018).*
(Continued)

*Primary Examiner* — Imran Akram
(74) *Attorney, Agent, or Firm* — Quarles & Brady LLP (57) ABSTRACT

The process described herein converts biomass directly into a combination of hydrogen, methane and carbon dioxide. A portion of the gases are collected at pressures above the thermodynamic critical pressure for water, which is 3200 psi (pounds per square inch). Typical operating pressure at the point where the first portion of gas collected can range from 3200 psi to 6000 psi. Upon cooling, most of the $CO_2$ condenses to a liquid. At this density and pressure, the $CO_2$ can be injected into a deep well aquifer to sequester the carbon dioxide. The overall process is superior to carbon neutral processes, can be carbon negative, and possesses the potential to reverse atmospheric $CO_2$ trends if implemented on a global scale.

34 Claims, 2 Drawing Sheets

(52) U.S. Cl.
CPC .............. *C10J 2300/0956* (2013.01); *C10J 2300/0959* (2013.01); *C10J 2300/0979* (2013.01); *C10J 2300/1253* (2013.01); *C10J 2300/1681* (2013.01); *C10J 2300/1892* (2013.01)

(58) Field of Classification Search
CPC ........ C10J 2300/0903; C10J 2300/1253; C10J 2300/1807; C10J 2300/1861; Y02P 20/54; Y02P 20/145; B01J 3/008; F28D 7/0091
See application file for complete search history.

(56) References Cited

U.S. PATENT DOCUMENTS

| | | | |
|---|---|---|---|
| 4,284,133 A | | 8/1981 | Gianni et al. |
| 4,564,458 A | | 1/1986 | Burleson |
| 4,594,164 A | | 6/1986 | Titmas |
| 4,822,497 A | | 4/1989 | Hong et al. |
| 5,057,220 A | * | 10/1991 | Harada .................. C02F 1/725 210/903 |
| 5,387,398 A | | 2/1995 | Mueggenburg et al. |
| 5,571,224 A | | 11/1996 | Aloisi et al. |
| 5,571,424 A | | 11/1996 | Ahluwalia |
| 5,670,040 A | | 9/1997 | Ahluwalia |
| 7,186,245 B1 | | 3/2007 | Cheng et al. |
| 7,863,489 B2 | | 1/2011 | Johnston et al. |
| 8,075,645 B2 | | 12/2011 | Jia et al. |
| 8,361,175 B2 | | 1/2013 | Goldacker et al. |
| 8,404,008 B2 | | 3/2013 | Wootton et al. |
| 8,536,234 B2 | | 9/2013 | Kukhar et al. |
| 8,550,835 B2 | | 10/2013 | Montena |
| 8,568,518 B2 | | 10/2013 | Bonekamp et al. |
| 8,727,000 B2 | | 5/2014 | O'Dowd |
| 8,888,875 B2 | | 11/2014 | Ramamurthy |
| 8,968,425 B2 | | 3/2015 | Kim et al. |
| 9,352,178 B2 | | 5/2016 | Surovtsev |
| 9,376,635 B2 | | 6/2016 | McGrady et al. |
| 9,656,230 B2 | | 5/2017 | Choi |
| 9,896,633 B2 | | 2/2018 | Graf et al. |
| 2007/0214721 A1 | | 9/2007 | Wootton et al. |
| 2009/0145028 A1 | * | 6/2009 | Ribesse ...................... C10J 3/08 48/197 FM |
| 2009/0151250 A1 | * | 6/2009 | Agrawal .................... C10J 3/00 48/202 |
| 2009/0206006 A1 | | 8/2009 | Allam |
| 2010/0041841 A1 | | 2/2010 | Terry et al. |
| 2010/0115841 A1 | * | 5/2010 | Cork ...................... C10B 53/02 48/209 |
| 2010/0170247 A1 | * | 7/2010 | Bommareddy ........ C10K 1/101 60/645 |
| 2010/0293918 A1 | * | 11/2010 | Gulko .................. F25J 3/04018 60/39.12 |
| 2011/0240261 A1 | * | 10/2011 | Ahlbeck ................. F28D 20/00 165/104.11 |
| 2013/0039818 A1 | | 2/2013 | Degenkolb et al. |
| 2013/0047509 A1 | * | 2/2013 | Ariyapadi .............. C10K 1/002 48/119 |
| 2014/0048744 A1 | | 2/2014 | Avagliano et al. |
| 2015/0377079 A1 | * | 12/2015 | Noureldin ............... C10K 1/046 60/671 |
| 2016/0075957 A1 | | 3/2016 | Cooke |
| 2016/0194569 A1 | | 7/2016 | Graf et al. |
| 2016/0351930 A1 | * | 12/2016 | Jahnke ...................... C25B 1/04 |
| 2017/0058718 A1 | * | 3/2017 | Noureldin ............... F01K 27/00 |
| 2017/0362119 A1 | | 12/2017 | Dejneka et al. |
| 2018/0117561 A1 | * | 5/2018 | Brucato .................... C10J 3/78 |
| 2018/0135004 A1 | * | 5/2018 | Bradin .................... C12P 7/649 |
| 2019/0039036 A1 | | 2/2019 | Brucato et al. |
| 2022/0220892 A1 | * | 7/2022 | Berry ....................... F01K 25/08 |

FOREIGN PATENT DOCUMENTS

| | | | | |
|---|---|---|---|---|
| CN | 106244241 B | * | 12/2018 | ......... C01B 13/0233 |
| RU | 2588294 C2 | * | 6/2016 | |
| RU | 2679330 C1 | * | 2/2019 | ............. F23G 5/027 |
| RU | 2017135814 A | | 4/2019 | |
| WO | 2017153970 A1 | | 9/2017 | |
| WO | WO-2018083785 A1 | * | 5/2018 | ................ C10J 3/72 |
| WO | 2018115593 A1 | | 6/2018 | |

OTHER PUBLICATIONS

Machine translation of WO-2018083785-A1 (Year: 2018).*
Castello et al., Supercritical Water Gasification of Biomass in a Ceramic Reactor: Long-Time Batch Experiments, Energies, 2017, 10(11):1734, pp. 1-17.
Richard et al., Corrosion of Ceramics for Vinasse Gasification in Supercritical Water, Journal of the European Ceramic Society, 2012, 32(10):2219-2233.
Machine Translation of WO2018083785.

* cited by examiner

Figure 1

SUPERCRITICAL WATER GASIFICATION PROCESS

CROSS-REFERENCES TO RELATED APPLICATIONS

This application represents the U.S. national stage entry of International Application No. PCT/US2020/047198 filed Aug. 20, 2020, which claims priority to U.S. Provisional Patent Application No. 62/889,716 filed Aug. 21, 2019, which is incorporated by reference herein for all purposes.

STATEMENT REGARDING FEDERALLY SPONSORED RESEARCH

Not applicable.

FIELD OF THE INVENTION

This invention relates to a process to convert biomass and like materials into the gases hydrogen, methane and carbon dioxide utilizing supercritical water and classified as supercritical water gasification (SCWG).

BACKGROUND

Economic production of hydrogen as an alternative to fossil fuels has been promoted for many years. Considering international policy objectives to reduce the amount of global carbon dioxide ($CO_2$) emissions to the atmosphere, the production of hydrogen through the electrolysis of water requires a source of electricity that is $CO_2$ neutral, leaving only biomass and nuclear energy.

What is needed therefore is a process to convert biomass and like materials into one or more of the gases hydrogen, methane and carbon dioxide.

SUMMARY OF THE INVENTION

The invention described herein converts biomass directly into a combination of hydrogen, methane and carbon dioxide. In order to maximize the overall system efficiency, special attention is given to arrangement of heat exchangers in the invention. Heat energy recovered from the product exiting the reactor (a mixture of water and gasification products) is used for preheating incoming feedwater. An important phenomenon pertaining to the differences in the thermodynamic properties of pure water and product mixtures must be recognized. Supercritical water no longer boils at a specific temperature and pressure. A supercritical fluid undergoes a rapid rate of change in density with respect to temperature at constant pressure. Simultaneously the isobaric specific heat capacity (Cp) undergoes a "spike". (See FIG. 2, which is a plot of isobaric heat content of pure water and an assumed product mixture versus temperature at a specified constant pressure.) The temperature at the peak of the spike is known as the pseudocritical temperature and occurs along the Windom line. The Windom line is an extension of the pressure versus temperature boiling point line for subcritical conditions. The isobaric specific heat spikes to its maximum, while other thermodynamic properties such as density and the speed of sound undergo rapid change with respect to temperature. It is important to recognize the difference in the pseudocritical temperatures between the product and pure feedwater. This phenomenon requires the implementation of a specific heat exchanger arrangement, and the management of excess feedwater flows to recuperate the lower grade energy available from the water and product mixture.

Pure water has a higher pseudocritical temperature, therefore a higher grade of energy, primarily the combustion of methane that is isolated from the product and combusted to heat the water through its pseudocritical range. To maximize energy capture from the product as it passes through its pseudocritical temperature, excess feedwater is pumped through the low temperature and medium temperature heat exchangers. The excess feedwater is flashed back to steam and high temperature feedwater after it exits the medium temperature heat exchanger. The term "excess feedwater" is defined as the difference between the mass flow high temperature feedwater entering the reactor relative to mass flow pumped through the low and medium temperature heat exchangers. The heat energy in the flash steam is utilized in the digestion and preheating of the biomass prior to introducing it into the supercritical water gasification reactor.

One advantage of this process is to design the heat exchanger configuration to maximize heat recovery from the product stream and to minimize the need for parasitic energy consumption of the process. In order to achieve an optimal design, it is important to recognize the physical properties of both supercritical water and the supercritical product produced in the supercritical water gasification (SCWG) process. Accurate thermodynamic data is required for both pure water and product mixtures as supercritical fluid passes through a temperature region designated as the pseudocritical temperature. The pseudocritical temperature is a function of the pressure, and is similar to the saturation temperature of a pure fluid in vapor-liquid equilibrium at pressures and temperatures when both the liquid and vapor phases are below the critical temperature and pressure for that specific fluid (i.e., subcritical). However, unlike a subcritical fluid characterized by distinctively different vapor and liquid phases, a supercritical fluid has significantly different characteristics, and the terms "liquid phase" and "vapor phase" are no longer applicable. The word "fluid" or "supercritical fluid" is often utilized by individuals skilled in the art of supercritical thermodynamics. The pseudocritical temperature is characterized by a sharp spike in the isobaric specific heat (Cp). The pseudocritical temperature and its corresponding pressure is the point when the isobaric specific heat is at maximum. This point is also characterized by the maximum rate of fluid density change with respect to a change in temperature. Other physical properties such as enthalpy, entropy, viscosity, thermal conductivity, and the solubility of other liquid and gases are at their maximum rate of change with respect to temperature.

While the pseudocritical properties of water are predictable and highly accurate for water when using the most current Equation of State for water [IAWPS Formulation 1995, W. Wagner, A. Pruß], the pseudocritical point of the product however has more variables and additional uncertainty. Factors such as the chemical analysis of the biomass, the mass fraction of the biomass relative to mass fraction of water injected into the reactor, molecular fractions of methane, hydrogen, carbon dioxide and water in the product all influence the pseudocritical parameters of the product. In general, the pseudocritical temperature of the product is 250° F.+/−50° F. lower than the feedwater. See FIG. 2 for additional detail. This means that largest change in enthalpy will occur at a lower temperature relative to the pure feedwater. Therefore, it is expected that there will be an excessive amount of energy available with recovering usable heat in the process in the product pseudocritical temperature range. In addition, there will be an energy deficit while the feedwater passes through its pseudocritical temperature range that will exceed what can be transferred from the product cooling requiring a supplemental energy source. The configuration of the heat exchangers and selection of strategy to control the operating temperatures must be done to accommodate this variability. Additional uncertainties arise from the lack of experimental data available pertaining to mixtures of hydrogen and water at the design operating pressure and temperature of this process. The same is true for methane and water mixtures for the same operating conditions.

A portion of the gases are collected at pressures above the thermodynamic critical pressure for water, which is 3200 psi (pounds per square inch). Typical operating pressure at the point where the first portion of gas collected can range from 3200 psi to 6000 psi. Upon cooling, most of the $CO_2$ condenses to a liquid. At this density and pressure, the $CO_2$ can be injected into a deep well aquifer to sequester the carbon dioxide. The overall process is superior to carbon neutral processes, is clearly carbon negative, and possesses the potential to reverse atmospheric $CO_2$ trends if implemented on a global scale.

In some aspects, the present disclosure provides a process for converting a biomass stream into a product stream comprising hydrogen, methane, and carbon dioxide using a supercritical water gasification reactor. The process exchanging heat, using a first heat exchanger, between a feedwater stream and the product stream, wherein the feedwater stream is heated by the product stream to a first temperature. The process further includes feeding the feedwater stream exiting the first heat exchanger to a heater that is configured to heat the feedwater stream from the first temperature to a second temperature. The process further includes exchanging heat, using a second heat exchanger, between the product stream and the feedwater stream exiting the heater, wherein the feedwater stream is heated by the product from the second temperature to a third temperature. The process further includes feeding the feedwater stream exiting the second heat exchanger to the heater, wherein the heater is configured to heat the feedwater stream from the third temperature to a fourth temperature. The process further includes reacting the feedwater stream provided by the heater with the biomass stream in the supercritical water gasification reactor to produce the product stream.

DETAILED DESCRIPTION OF THE INVENTION

In some aspects, the present disclosure provides a supercritical water gasification system and process of using the same for converting biomass into a product stream comprising hydrogen, methane, and carbon dioxide.

Figure 1:
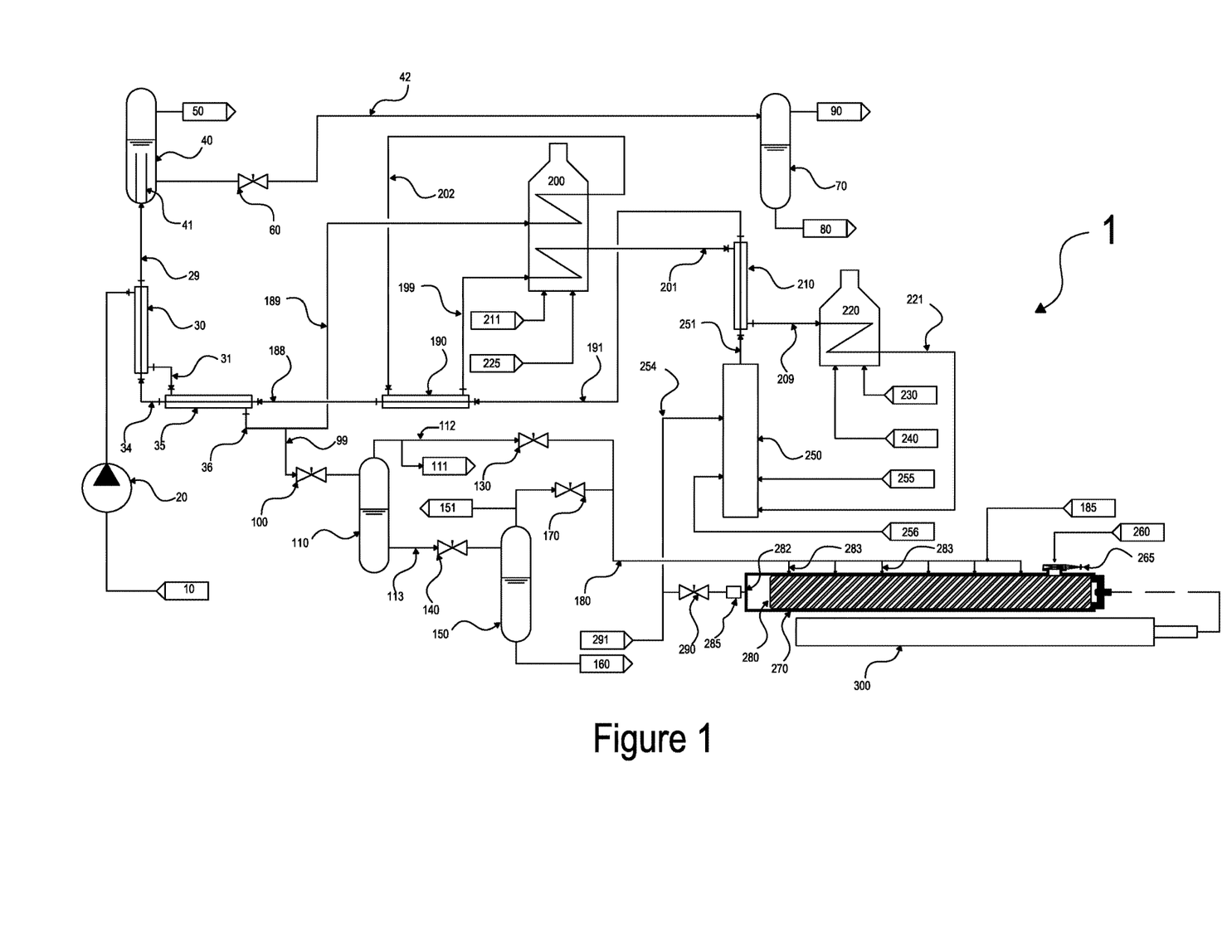
FIG. 1 is a schematic diagram of a supercritical gasification system configured to convert a biomass stream into a product stream in accordance with some aspects of the disclosure.

Referring to FIG. 1, the process includes providing a supercritical water gasification system 1. In some aspects, the process includes transporting a feedwater stream from a feedwater source 10 to heat exchanger 30 using a pump 20.

In some aspects, the feedwater from the feedwater source 10 is purified water. As used herein, "purified water" may refer to water that has been mechanically filtered and/or processed to remove impurities using, for example, distillation, capacitive deionization, reverse osmosis, carbon filtering, microfiltration, ultrafiltration, ultraviolet oxidation, electrodeionization, demineralization, deoxygenation, or combinations thereof. Purified water facilitates the protection against erosion and scaling of the heating units within the supercritical water gasification system 1.

In some aspects, the temperature of the feedwater stream entering pump 20 ranges from 100° F. to 225° F. The feedwater entering pump 20 may be initially heated at the feedwater source 10. In some aspects, the temperature of the feedwater entering pump 20 is at least 100° F., or at least 110° F., or at least 120° F., or at least 130° F., or at least 140° F., or at least 150° F., or at least 160° F., or at least 170° F., or at least 180° F., to less than 190° F., or less than 200° F., or less than 210° F., or less than 225° F. Without wishing to be bound to a particular theory, it is contemplated that the initial feedwater temperature influences the amount of high-pressure vapor captured in collector vessel 40. The solubility of gases, as defined by Henry's Constant is a function of the mixture temperature. As the mixture is cooled, the solubility of hydrogen, methane, carbon dioxide and carbon monoxide in water decrease which results in an increase in the yield of gaseous phase hydrogen and methane at the high-pressure condition. The high-pressure gaseous phase product offers both opportunities for purification of hydrogen and storage of hydrogen without the need for costly gas compression equipment and the associated energy needed to operate the compressors.

In some aspects, the pump 20 discharges the feedwater at a pressure above atmospheric pressure. For example, the pressure of the feedwater exiting the pump 20 may range from 4500 psia to 6500 psia. In some aspects, the pressure of the feedwater exiting the pump 20 is at least 4500 psia, or at least 4750 psia, or at least 5000 psia, or at least 5225 psia, or at least 5500 psia, to less than 5725 psia, or less than 6000 psia, or less than 6225 psia, or less than 6500 psia.

In some aspects, the process includes an initial heating step of the feedwater stream. In some aspects, the initial heating step includes exchanging heat between the feedwater stream and the product stream using at least one heat exchanger. As illustrated in FIG. 1, the initial heating step of the feedwater stream is accomplished using heat exchanger 30 and heat exchanger 35. In some aspects, the heat exchanger 30 provides an initial heating of the feedwater stream and a final cooling of the product stream derived from supercritical water gasification reactor 250. The heat exchangers 30, 35 may be configured to exchange heat between the feedwater stream and the product stream to heat the feedwater stream. In some aspects, heat exchangers 30, 35 are shell and tube heat exchangers. In some configurations, the product stream may flow through at least one tube side, and the feedwater stream may flow through at least one shell side of the heat exchangers 30, 35. Conduit 34 places the product stream exiting heat exchanger 35 in fluid communication with heat exchanger 30. Conduit 31 places the feedwater stream exiting the heat exchanger 30 in fluid communication with the heat exchanger 35.

In some aspects, the heat exchanger 30 is oriented in a vertical position such that the product stream flows upwards through the respective heat exchanger 30, 35. As the product stream cools within heat exchanger 30 the formation of vapor phase bubbles of hydrogen, methane, carbon monoxide and carbon dioxide which are at their maximum, and the buoyancy of the vapor phase assists in the phase separation as the liquid vapor mixture flows out of the heat exchanger 30 and into collector vessel 40. The feedwater stream may flow counter current to the product stream. In some aspects, baffles (not depicted) direct the feedwater stream, and increase feedwater stream's velocity and turbulence for an improved overall heat transfer coefficient.

In some aspects, heat exchanger 35 is oriented in a horizontal position. In some aspects, the components in the product stream (e.g., $H_2$, $CH_4$, $CO_2$, and CO) are in a pseudocritical state within heat exchanger 35. In the pseudocritical state, rapid density changes may occur as gas-liquid phase separations begin. Orientating the heat exchanger 35 in the horizontal position may prove to be advantageous in providing increased stability during operation of the heat exchanger 35.

In some aspects, the heat exchanger 30 heats the feedwater stream to a temperature in the range of 300° F. to 450° F. In some aspects, the heat exchanger 30 heats the feedwater stream to a temperature of at least 300° F., or at least 325° F., or at least 350° F., or at least 375° F., to less than 400° F., or less than 425° F., or less than 450° F.

In some aspects, the heat exchanger 30 cools the product stream to a temperature of 50° F. to 250° F. In some aspects, the heat exchanger 30 cools the product stream to a temperature of less than 250° F., or less than 225° F., or less than 200° F., less than 175° F., to at least 150° F., or at least 125° F., or at least 100° F., or at least 75° F., or at least 50° F.

In some aspects, the heat exchanger 35 heats the feedwater stream to a temperature in the range of 350° F. to 800° F. In some aspects, the heat exchanger 35 heats the feedwater stream to a temperature of at least 350° F., or at least 375° F., or at least 400° F., or at least 425° F., or at least 450° F., or at least 475° F., or at least 500° F., or at least 525° F., or at least 550° F., to less than 575° F., or less than 600° F., or less than 625° F., or less than 650° F., or less than 675° F., or less than 700° F., or less than 725° F., or less than 750° F., or less than 775° F., or less than 800° F.

In some aspects, the heat exchanger 35 cools the product stream to a temperature from 875° F. to 425° F. In some aspects, the heat exchanger 35 cools the product stream to a temperature of less than 875° F., or less than 850° F., or less than 825° F., or less than 800° F., or less than 775° F., or less than 750° F., or less than 725° F., or less than 700° F., or less than 675° F., or less than 650° F., or less than 625° F., or less than 600° F., to at least 550° F., or at least 525° F., or at least 500° F., or at least 475° F., or at least 450° F., or at least 425° F., or at least 400° F.

Although FIG. 1 depicts two heat exchangers 30, 35, it is to be appreciated that a series of heat exchangers could be used for the initial heating of the feedwater stream and final cooling of the product stream. For example, at least three heat exchangers could be used, or at least four, or at least five, ten, or more. The series of heat exchangers could be used to heat the feedwater stream and/or the product stream to any of the aforementioned temperatures described with respect to heat exchangers 30, 35.

In some aspects, the feedwater stream exiting heat exchanger 35 flows through conduit 36. The conduit 36 may split at a junction into conduit 99 and conduit 189. The conduit 189 places the feedwater side of the heat exchanger 35 in fluid communication with a heater 200. The heater 200 is configured to heat the feedwater stream, e.g., by passing the conduit 189 through the heater 200.

In some aspects, the series of heat exchangers 30, 35 heat the feedwater stream through the temperature range associated with the pseudocritical temperature of water. The pseudocritical temperature of pure water at 5000 psia is 778° F. At this temperature, the specific heat of water is 4.25 Btu lbm-1° F.$^{-1}$. This value is 4.25 times greater than water at standard temperature and pressure. This specific heat is also greater than the ideal isobaric specific heat of water vapor by a factor of 9.0 for water vapor at saturated pressure conditions (0.46 psia) and standard temperature (77° F.). The feedwater stream in conduit 189 may be heated to a temperature from 750° F. to 850° F. as the feedwater stream in conduit 202 exists the heater 200.

Figure 2:
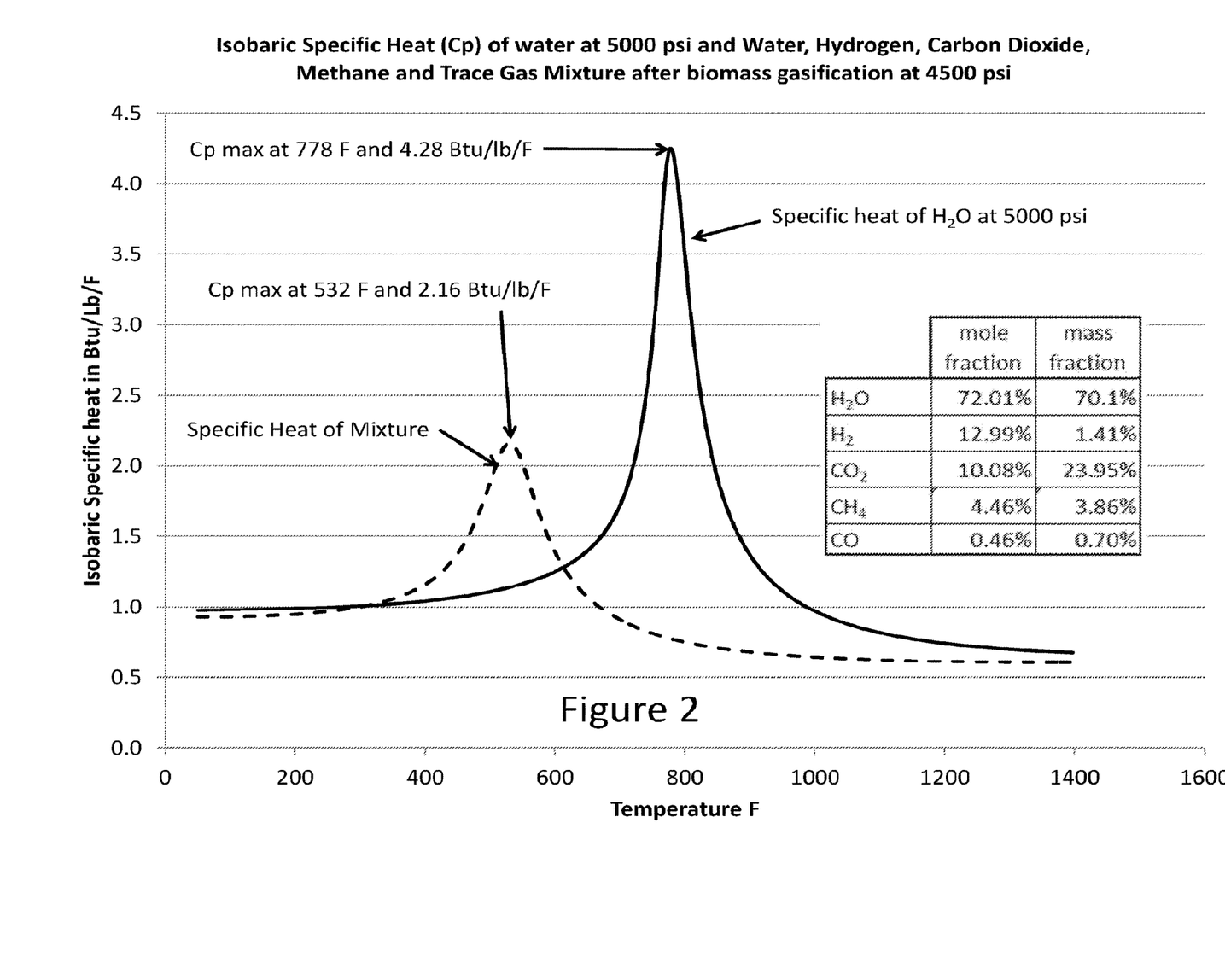
FIG. 2 shows the isobaric specific heat (Cp) of water at 5000 psi and water, hydrogen, carbon dioxide, methane and trace gas mixture after biomass gasification at 4500 psi.

In some aspects, the heater 200 heats the feedwater stream to a temperature of at least 750° F., or at least 775° F., to less than 800° F., or less than 825° F., or less than 850° F. Referring, to FIG. 2, this heating may cover all of the energy needs on the left hand side of the isobaric specific heat spike, and a portion of the energy needed by the right hand side.

In some aspects, conduit 202 places the feedwater stream exiting the heater 200 in fluid communication with heat exchanger 190. The heat exchanger 190 is configured to exchange heat between the product stream and the feedwater stream provided by the conduit 202. In some aspects, the temperature of the product stream entering heat exchanger 190 ranges from 800° F. to 950° F. In some aspects, the heat exchanger 190 cools the product stream that exits heat exchanger 190 through conduit 188 to a temperature from 750° F. to 850° F. In some aspects, the heat exchanger 190 cools the product stream to a temperature of less than 850° F., or less than 825° F., to at least 800° F., or at least 775° F., or at least 750° F.

The feedwater stream exits the heat exchanger 190 through conduit 199, which places the feedwater side of the heat exchanger 190 in fluid communication with the heater 200. In some aspects, the heat exchanger 190 exchanges heat from the product stream to the feedwater stream to heat the feedwater stream to a temperature from 800° F. to 875° F. In some aspects, the temperature of the feedwater stream exiting the heat exchanger 190 and in conduit 199 is at least 800° F., or at least 825° F., to less than 850° F., or less than 875° F.

The feedwater stream is then fed to the heater 200 through conduit 199 for additional heating, e.g., by passing conduit 199 through the heater 200 for a second pass. In some aspects, the heater 200 heats the feedwater stream in the conduit 199 to a temperature from 810° F. to 900° F. In some aspects, the heater 200 heats the feedwater stream in the conduit 199 to a temperature of at least 810° F., or at least 825° F., or at least 850° F., to less than 875° F., or less than 900° F.

In some aspects, combustion air is supplied to the heater 200 by a fan into conduit 211 along with a gaseous fuel from a source 225. The combustion air and gaseous fuel combine and are ignited for combustion in a burner that is integral to the heater 200. The thermal energy generated from the combustion is transferred to the feedwater stream. The process temperature set point may be measured in conduit 201 and controls air and fuel flows to process heater 200 and is derived from a process control algorithm that measures temperatures in conduits 191, 209 and 254 and are based on optimization of heat transfer in heat exchanger 210 and the minimization of fuel consumption in the heater 200. In some aspects, the heater 200 can be fueled by methane separated from the product stream, and will be detailed later.

In some aspects, conduit 201 places the feedwater stream exiting the heater 200 from the second pass in fluid communication with heat exchanger 210. In some aspects, the heat exchanger 210 is a shell and tube heat exchanger, arranged in a counter flow arrangement. In some aspects, the heat exchanger 210 exchanges heat between the product stream derived from the supercritical water gasification reactor 250 and the feedwater stream from conduit 201. In some aspects, the product stream enters the heat exchanger 210 through at least one tube side, and the feedwater stream enters the heat exchanger 210 through at least one shell side.

In some aspects, the feedwater stream exits the heat exchanger 210 through conduit 209 and is heated to a temperature from 900° F. to 1500° F. In some aspects, the feedwater stream exiting the heat exchanger 210 is heated to a temperature of at least 900° F., or at least 925° F., or at least 950° F., or at least 975° F., or at least 1000° F., or at least 1050° F., or at least 1100° F., or at least 1150° F., or at least 1200° F., or at least 1250° F., to less than 1300° F., or less than 1350° F., or less than 1400° F., or less than 1450° F., or less than 1500° F.

In some aspects, the product stream exiting the supercritical water gasification reactor 250 is placed in fluid communication with the heat exchanger 210 through conduit 251. In some aspects, the temperature of the product stream exiting the supercritical water gasification reactor 250 is from 950° F. to 1600° F. In some aspects, the temperature of the product stream exiting the reactor is at least 950° F., or at least 1000° F., or at least 1050° F., or at least 1100° F., or at least 1150° F., or at least 1200° F., or at least 1250° F., or at least 1300° F., or at least 1350° F., to less than 1400° F., or less than 1450° F., or less than 1500° F., or less than 1550° F., or less than 1600° F. In some aspects, the heat exchanger 210 cools the product stream to the aforementioned temperatures described for conduit 191. The upper limit of reactor product exit temperatures depends on the allowable stress and temperature limits of current metallurgical limitations. It is anticipated that the upper temperature limit described herein could increase beyond the specified values as new metallurgical materials are developed and adopted by current pressure vessel design codes.

In some aspects, the inlet temperature difference (ITD) of the reactor ranges from 5° F. to 125° F. As used herein, the ITD may refer to the difference in the temperature between the product stream entering the heat exchanger 210 and the feedwater streams exit temperature in conduit 209. In some aspects, the ITD is at least 5° F., or at least 10° F., or at least 15° F., or at least 20° F., or at least 25° F., or at least 50° F., to less than 75° F., or less than 100° F., or less than 125° F.

In some aspects, conduit 209 places the feedwater stream exiting the heat exchanger 210 in fluid communication with heater 220. The heater 220 is configured to heat the feedwater stream, e.g., by passing the conduit 209 through the heater 220. In some aspects, the heater 220 heats the feedwater stream to temperature from 1000° F. to 1600° F. In some aspects, the heater 220 heats the feedwater stream to a temperature of at least 1000° F., or at least 1050° F., or at least 1100° F., or at least 1150° F., or at least 1200° F., or at least 1250° F., or at least 1300° F., or at least 1350° F., to less than 1400° F., or less than 1450° F., or less than 1500° F., or less than 1550° F., or less than 1600° F. As described above, the upper temperature limit may increase as new metallurgical materials are developed.

The feedwater stream exits the heater 220 and is placed in fluid communication with the supercritical water gasification reactor 250 by conduit 221. Conduit 254 places the supercritical water gasification reactor 250 in fluid communication with a biomass stream. The supercritical water gasification reactor 250 is configured to contact the feedwater stream with the biomass stream to convert the biomass into the product stream comprising hydrogen, methane, and carbon dioxide.

In some aspects, the supercritical water gasification reactor 250 optionally includes a fuel source 255 and/or an oxidizer source 256. The fuel conduit 255 and the oxidizer conduit 256 may be configured in a lower section of the reactor 250, e.g., at a point below where the biomass stream is introduced into the reactor 250. The fuel and/or oxidizer added to the reactor 250 may advantageously provide an additional boost in temperature inside the reactor 250. The increased reactor internal temperature improves the rate of the chemical reactions that convert the biomass stream into the product stream, and may also offset the partial cooling of the hotter feedwater stream when it mixes with the cooler biomass stream. In a reactor design that contains an internal thermal shield, higher temperatures can be achieved without impacting the metallurgical limitations of the reactor pressure vessel shell.

Suitable oxidizers include, but are not limited to, hydrogen peroxide, air, ozone, enriched oxygen or pure oxygen. In some aspects, the pressure of the oxidizer is slightly greater than the pressure inside the reactor 250. In some aspects, the pressure of the reactor 250 ranges from 4000 psia to 6000 psia. Suitable fuels include, but are not limited to, methane or a mixture of methane and carbon monoxide recovered from the product stream.

In some aspects, a portion of the feedwater stream is used to digest biomass into the biomass stream. Referring back to the junction in conduit 36, the conduit 99 places the feedwater side of the heat exchanger 35 in fluid communication with a flash tank 110. The flow of the feedwater stream to the flash tank 110 may be controlled using a control valve 100. The control valve 100 may be adjusted by an automatic process control loop algorithm that utilizes approximately a series of process temperatures and pressures. In an exemplary aspect, the control valve utilizes fourteen process temperatures, two process pressures and two flow measurements encompassing the process conditions around the heat exchanger 30, the heat exchanger 35, the heat exchanger 190, and the flash tank 110. The algorithm controlling the control valve 100 may advantageously optimize the heat transfer in the heat exchangers 30, 35, and 190.

In some aspects, the pressure in the flash tank 110 can range from 750 psia to 2500 psia. Given that the water temperature entering control valve 100 ranges from 350° F. to 800° F., and given that the pressure in flash tank 110 operates at a pressure that is less than the critical pressure of water (3200 psia), the stream will undergo a phase separation split, i.e., flashing, into a steam vapor phase and a liquid water phase. The mass fraction vaporized can range from 1% to 25%. In some aspects, the mass fraction vaporized is at least 1%, or at least 5%, or at least 10%, or at least 15%, to less than 20%, or less than 25%.

The steam fraction flows out of top of flash tank 110 into conduit 112, which places the flash tank 110 in fluid communication with a steam distribution header 180. The steam distribution header 180 controls the amount of steam utilized to digest the biomass in a biomass digester 270, and is explained in greater detail below. The flow of steam through the conduit 112 is controlled by control valve 130.

In some aspects, steam from flash tank 110 could be used by a steam turbine via conduit 111 to generate electricity (steam turbine not depicted). The liquid fraction in the lower section of flash tank 110 is drained through level control valve 140 into flash tank 150 by a conduit 113. The level of liquid phase water in flash tank 110 controls the opening of level control valve 140. The regulation of flow control valve 140 controls the mass flow of water passing from flash tank 110 into flash tank 150.

In some aspects, the flash tank 150 operates at a pressure from 25 psia to 150 psia. The liquid phase water that enters the flash tank 150 is split into a liquid and steam vapor phase. Steam exiting the top of the flash tank 150 is regulated by flow control valve 170 into steam header 180 and may also be used by biomass digester 270. Extra steam, if available is diverted through connector 151 into a low pressure steam distribution system and can also be used in a low pressure steam turbine (not depicted) to generate power.

In some aspects, the biomass digester 270 includes a piston 280 and a hydraulic cylinder 300. Raw biomass feedstock enters the biomass digester 270 through conduit 260. The biomass digester 270 houses the biomass during digestion to generate the biomass stream. Following digestion, pressurization of the biomass digester 270 through precise control of piston 280 may be utilized to deliver the biomass stream to the reactor 250.

In some aspects, raw biomass feedstock is supplied through conduit 260, and regulated by valve 265. Piston 280 may be modulated to advance the biomass down the biomass digester 270 toward a discharge end 282. In some aspects, the biomass digester 270 includes a strainer 285 and discharge control valve 290, which are connected to the discharge end 282. In some aspects, the biomass feedstock is chipped or milled to improve digestion. At the end of the raw biomass filling step, valve 265 is closed. In the next step, steam is introduced through an array of openings 283 in biomass digester 270, which are in fluid communication with supply header pipe 180. Steam is regulated to the steam header 180 by valves 130 and 170. While not depicted, every opening in the biomass digester 270 may be fitted with a fine screen and a check valve to prevent the backup of particle matter or digested biomass into the array piping and steam header 180. During the steam heating step, the biomass is heated and some of the steam condenses into the liquid phase until the biomass reaches the saturation temperature given the steam pressure supplied. In one non-limiting example, the temperature of the material inside the biomass digester 270 at the end of the second step ranges from 220° F. to 275° F.

In some aspects, the process includes an optional third step. The third step includes the addition of one or more digester additive to improve the rate of biomass digestion. A significant number of digester additives have been shown to improve the rate and degree of breakdown of the extensive network of long polymer chain found in most biomass feed stocks. Suitable digester additives include organic compounds, such as methanol. The digester additive may be added to the biomass digester 270 through conduit 185.

In some aspects, a fourth step in the digestion processes includes the addition of steam at a pressure of 750 psi to 2500 psi provided by flash tank 110 and valve 130. The saturation temperature associated with steam pressure is between 520° F. and 670° F. This temperature promotes rapid depolymerization of the biomass to convert the biomass to a slurry or liquid form. In addition, the condensation of the steam increases the overall water content of the batch that can improve the pumping characteristics of the mixture. While the term "digestion" is used here, it must be pointed out no actual aerobic or anaerobic digestion is necessarily occurring. The digestion process in the example embodiment may be a thermal chemical process. The biomass may also be aerobic or anaerobically digested prior to the addition of steam.

While the pressure is building inside the pumping chamber, the hydraulic pressures provided to hydraulic cylinder 300 is increased to balance the forces in the piston, with the objective of keeping the piston at a constant position while pressurization with the high pressure steam. Over time the mixture inside the biomass digester 270 approaches thermal equilibrium with the provided steam.

In some aspects, the steam supply valve 130 is closed and the pressure inside the biomass digester 270 is increased by advancing piston 280 by increasing the hydraulic fluid pressure in hydraulic cylinder 300. FIG. 1 only illustrates the hydraulic cylinder 300. Hydraulic reservoirs, pumps, piping, valves and instrumentation have been excluded from FIG. 1. The detailed design of this hydraulic subsystem is achievable by anyone skilled in the art of hydraulic equipment technology and fluid mechanics. The piston 280 is advanced until the pressure in the biomass digester 270 is equal to the pressure in the reactor 250.

In some aspects, the biomass stream is delivered to the reactor 250 with the opening of the discharge control valve 290, which allows the liquefied biomass to flow into the reactor 250. The speed of the piston 280 may be regulated by controlling the hydraulic fluid into hydraulic cylinder 300. This in turn allows for precise control over the amount of the biomass stream delivered to the supercritical water gasification reactor 250. Strainer 285 filters out undigested biomass and foreign material that is oversized. When the piston has advanced to the bottom of the cylinder, the discharge control valve 290 is closed and the piston is fully retracted to start another cycle.

While only a single biomass digester 270 is illustrated in FIG. 1, it is to be appreciated that multiple biomass digesters 270 could be used to provide the biomass stream to the reactor 250.

The moisture content of the raw feedstock entering the biomass digester 270 through conduit 260 is typically determined by drying a representative sample of biomass in an oven that is heated to a temperature that is slightly greater than the boiling point of water, generally between 220° F. and 240° F. until the rate of change in the sample weight becomes constant. While many crop biomass feed stocks have somewhat similar chemical analysis, moisture contents can deviate significantly. Typically, moisture contents can range from 25% to 60%. The most common form of chemical analysis is called the "ultimate analysis" and is quantitative analysis reporting the relative abundance of the elements carbon, hydrogen, nitrogen, oxygen and sulfur. This information along with the moisture content and calorific heating value are facts useful in understanding and predicting reactor operating conditions, and product chemical analysis. In some aspects, the product chemical analysis in conduit 251 may remain constant throughout the product stream cooling process as the product passes through the heat exchanger 210, heat exchanger 190, heat exchanger 35, and heat exchanger 30.

Using the quantitative definition of molecular fractions, also known as "mole fraction", the product stream can be described in terms of the mole fractions of the products. By definition, the summation of the mole fractions of all different molecules in a mixture in equilibrium is one. In the example embodiment, $H_2O$ will typically be in the range of 0.65 and 0.95. The remaining constituents are hydrogen, methane and carbon dioxide. Carbon monoxide is also found to a lesser extent. Both experimental and theoretical data indicate a wide range of mole fractions, however this is not unexpected given the wide range of biomass feed stocks, reactor operating conditions, and in some cases the use of catalysts to favor specific reactions.

At standard temperature and pressure (14.696 psia and 77° F.) hydrogen, methane, carbon dioxide, and carbon monoxide are all in the gaseous state, and water is a liquid. At supercritical conditions for water, the water is a dense fluid in a homogeneous mixture with the product gases. As the product temperature is cooled in the medium and low temperature heat exchanger, the water density increases rapidly, and phase separation of the product gases occurs. Hydrogen, methane and carbon monoxide have the lower solubility. Solubility of gases in water is quantitatively described and calculated with Henry's constant. The formula for Henry's constant describes the maximum mole fraction of a gas that can be absorbed into the liquid phase of water given the gas vapor pressure in contact with the water. The mole fraction of absorbed gas increases with total pressure. However, it is important to note that Henry's constant is not a true constant since it is also a function of the water temperature. Finally, Henry's constant is only applicable for the binary mixture of a pure specific gas and water. Mixtures of gases require a more rigorous analysis to obtain the mole fractions in solution with the water, and the fractions of the gases in the gaseous phase.

Referring back to FIG. 1, as the product stream is cooled and the temperature of the product drops below 700° F. in heat exchangers 30 and 35, a portion of the product stream is liberated from liquid phase product into the vapor phase. The vapor phase is much lower in density, therefore the product rising in heat exchanger 30, and in conduit 29 flowing up to separator 40 is, in some aspects, a mixture of a denser liquid phase and bubbles of a less dense vapor phase. The separator 40 includes a guide tube conduit 42 for dispensing the gas phase near the top of the vessel to minimize vapor bubbles exiting the liquid discharge flowing into valve 60, and a gas conduit 50 for dispensing the vapor phase.

In some aspects, the operating temperatures of steam 29 will be controlled from 150° F. to 200° F. This may be achieved by controlling the temperature of the feedwater entering the pump. Hydrogen, methane, and carbon monoxide are the least soluble in water at temperatures between 125° F. to 225° F. Carbon dioxide is more soluble and a relatively larger mole fraction of it will remain dissolved in the liquid phase. The gas collected via conduit 50 will have a better fuel quality in comparison to the fuel quality collected in separator 70 since much more of the carbon dioxide will transfer out of the liquid phase.

In some aspects, the pressure in the separator 40 can range from 3600 psi to 5000 psi. In some aspects, the pressure of the separator 40 is at least 3600 psi, or at least 3700 psi, or at least 3800 psi, or at least 3900 psi, or at least 4000 psi, or at least 4100 psi, or at least 4200 psi, to less than 4300 psi, or less than 4400 psi, or less than 4500 psi, or less than 4600 psi, or less than 4800 psi, or less than 4900 psi, or less than 5000 psi.

In some aspects, operating separator 40 at a pressure in a range from 3600 psi to 5000 psi offers economic benefits to the process. For example, at these specified pressures the product stream may be separated into a liquid phase and a vapor phase, where at least 95% mole fraction of $H_2$, $CH_4$, $CO_2$ and CO will enter the vapor phase in separator 40. The remaining mole fraction of $H_2$, $CH_4$, $CO_2$ and CO will remain in the liquid phase exiting separator 40, and flashing into a mixture of gas and water as the pressure is reduced in valve 60.

The rate at which gas product is regulated out of the separator 40 may be controlled by the liquid level. In some aspects, the liquid level is maintained above a guide tube 41.

The guide tube 41 assists in liquid separation from the gas phase and prevents gas bubbles exiting 42. A benefit of collecting a portion of the product gas via 50 at the high pressures in separator 40 can provide assistance in purification of hydrogen. The high pressure gas in separator 40 can drive processes adiabatic expansion to cool the product to allow cryogenic distillation.

Other gas separation processes, such as molecular sieves and membrane separation, may be utilized to separate the vapor phase exiting stream 50. Stream 50 may be placed in fluid communication with the gas separation process (not depicted). The separation of gasses has a variety of technologies known to those skilled in the art of gas separation. The gas separation system separates stream 50 into a hydrogen stream, a carbon monoxide stream, a methane stream, and a carbon dioxide stream. The hydrogen can be liquefied, botted as a high pressure gas, or go directly into a combustion turbine to provide energy, efficient fuel cells or processes that use hydrogen to make another product. Carbon monoxide and methane can be combusted to produce the heat for heater 200 and heater 220, and can also be the normal operating source of fuel steams 225 and 230. The carbon dioxide stream can either be gaseous or liquid. Liquid is preferred if the carbon dioxide is sequestered into a subsurface geological formation that is appropriate for accepting the fluid.

Control valve 60 meters liquid flow in conduit 42. The conduit 42 places the separator 70 in fluid communication with the separator 40. Pump 20 and valve 60 may be controlled in unison to maintain both pressure and flow rates of feedwater and product. In some aspects, valve 60 could be replaced with a piston pump run in reverse to recover energy available in the high pressure liquid. In some aspects, the separator 70 is operated at a lower pressure than the separator 40. For example, suitable pressures for separator 70 may range from 15 psia to 150 psia. In some aspects, separator 70 operates at a pressure of at least 15 psia, or at least 25 psia, or at least 50 psia, or at least 75 psia, or at least 100 psia, to less than 125 psia, or less than 150 psia.

At these pressures, most of the remaining dissolved gases flash out of the liquid state. The low pressure gas product exiting in stream 90 will have a much greater mole fraction of carbon dioxide than in conduit 50, but will still contain some hydrogen, methane, and carbon monoxide. Stream 90 is preferably the first source of combustible gases fuel for process heaters 200 and 220. The mostly degassed water exits in flow stream 80. Control valves in conduit 80 may be used to control the liquid level in the separator vessel 70. The gas pressure in the separator 70 may be maintained by controlling the rate of gas product removed in conduit 90. Water collected in conduit 80 may be recovered, vacuum de-gassed, polished and recycled back to the feedwater source 10.

The flow of the feedwater stream, the biomass stream, and the product stream throughout the process may be described using a dimensionless mass flow. As used herein, the term "dimensionless mass flow" is defined as $M^*_i = M_i / M_{221}$ where $M^*_i$ is the dimensionless mass flow of the specific stream number designated as "i" in the subscript, $M_i$ is the specific mass flow given in units of mass units dividend by time units, $M_{221}$ is the mass flow of the feedwater stream entering the supercritical water gasification reactor 250 through conduit 221, thus resulting in a dimensionless reactor feedwater flow of $M^*_{221} = 1.00$ for all designs described herein, regardless of scale and process conditions.

In some aspects, the feedwater mass flow up to conduit 36 is in excess of feedwater required by the reactor 250. This may be done to facilitate the capture of excess medium temperature energy that is a direct result of the high isobaric specific heat "spike" in the product that occurs as the product passes through the pseudocritical temperature transition. This provides an opportunity to capture some medium temperature grade energy that can be used for heating and cooking of the biomass prior to feeding it to the reactor 250.

In some aspects, the dimensionless feedwater mass flow for $M^*_{36}$ exiting the heat exchanger 35 through pipe 36 ranges from 1.5 to 2.75. In some aspects, $M^*_{36}$ is at least 1.5, or at least 1.6, or at least 1.7, or at least 1.8, or at least 1.9, or at least 2, or at least 2.1, or at least 2.2, to less than 2.3, or less than 2.4, or less than 2.5, or less than 2.6, or less than 2.75.

In some aspects, the dimensionless feedwater mass flow for $M^*_{99}$ ranges from 0.5 to 1.75. In some aspects, the $M^*_{99}$ is at least 0.5, or at least 0.6, or at least 0.7, or at least 0.8, or at least 0.9, or at least 1, or at least 1.1, or at least 1.2, or at least 1.3, to less than 1.4, or less than 1.5, or less than 1.6, or less than 1.75.

In some aspects, the dimensionless product stream mass flow $M^*_{191}$ in conduit 191 ranges from 1.1 to 2.2. In some aspects, the $M^*_{191}$ is at least 1.1, or at least 1.2, or at least 1.3, to less than 1.4, or less than 1.5, or less than 1.6, or less than 1.7, or less than 1.8, or less than 1.9, or less than 2.0, or less than 2.1, or less than 2.2.

In some aspects, the averaged (converted from batch flows to average continuous mass flow) dimensionless dry basis mass flow of the biomass stream $M^*_{260}$ entering in conduit 260 ranges from 0.05 to 0.45. In some aspects, the $M^*_{260}$ is at least 0.05, or at least 0.20, or at least 0.30, to less than 0.40, or less than 0.45. In some aspects, the biomass is taken as a dry basis mass. If one assumes the biomass moisture content 47.5% as measured at conduit 260, and adding the cooking steam within the biomass digester 270 to raise the biomass to a temperature of 580° F. to 670° F., the moisture content of the cooked biomass is expected to be 65% to 75% water on a mass basis. At this temperature and moisture content, the cooked biomass is expected to be adequately liquefied to flow freely in the piping system from the pumping source to the inlet of the reactor. The steam used to cook the biomass is supplied by stream 180 and is in direct contact with the biomass. The steam is condensed to a liquid in the direct heating process. After cooking, the mass flow entering the reactor 250 through conduit 254 may have a dimensionless mass flow $M^*_{254}$ from 0.15 to 1.5. In some aspects, $M^*_{254}$ is at least 0.15, or at least 0.2, or at least 0.3, or at least 0.4, or at least 0.5, or at least 0.6, or at least 0.7, or at least 0.8, or at least 0.9, or at least 1, to less than 1.1, or less than 1.2, or less than 1.3, or less than 1.4, or less than 1.5.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

The invention claimed is:

1. A process for converting a biomass stream into a product stream comprising hydrogen, methane, and carbon dioxide using a supercritical water gasification reactor, the process comprising:
   (i) exchanging heat, using a first heat exchanger, between a feedwater stream and the product stream, wherein the feedwater stream is heated by the product stream to a first temperature;
   (ii) feeding the feedwater stream exiting the first heat exchanger to a heater that is configured to heat the feedwater stream from the first temperature to a second temperature;
   (iii) exchanging heat, using a second heat exchanger, between the product stream and the feedwater stream exiting the heater, wherein the feedwater stream is heated by the product from the second temperature to a third temperature;
   (iv) feeding the feedwater stream exiting the second heat exchanger to the heater, wherein the heater is configured to heat the feedwater stream from the third temperature to a fourth temperature, and exchanging heat, using a third heat exchanger, between the product stream exiting the reactor and the feedwater stream exiting the heater and entering the reactor; and
   (v) reacting the feedwater stream provided by the heater with the biomass stream in the supercritical water gasification reactor to produce the product stream, wherein the product stream includes a supercritical product.

2. The process of claim 1 wherein step (i) further includes utilizing an additional heat exchanger to exchange heat between the product stream and the feedwater stream, wherein a combination of the first heat exchanger and the additional heat exchanger heat the feedwater stream to the first temperature.

3. The process of claim 2 wherein:
   the additional heat exchanger is the initial heat exchanger for heating the feedwater stream, and
   the feedwater stream is pure water.

4. The process of claim 1 wherein the feedwater stream is heated by the third heat exchanger from the fourth temperature to a fifth temperature.

5. The process of claim 4, wherein the fifth temperature ranges from 900° F. to 1500° F.

6. The process of claim 4 wherein step (iv) further includes feeding the feedwater stream exiting the third heat exchanger to a second heater, wherein the second heater is configured to heat the feedwater stream from the fifth temperature to a sixth temperature.

7. The process of claim 6, wherein the sixth temperature ranges from 1000° F. to 1600° F.

8. The process of claim 1 further comprising feeding the biomass stream to the supercritical water gasification reactor from a biomass digester.

9. The process of claim 8 further comprising feeding a portion of the feedwater stream exiting the first heat exchanger to the biomass digester to digest biomass to produce the biomass stream.

10. The process of claim 9 further comprising flashing, using at least one flash tank, the feedwater stream exiting the first heat exchanger to produce a steam stream and a liquid stream, wherein the process further includes feeding a portion of the steam stream to the biomass digester to digest the biomass into the biomass stream.

11. The process of claim 10 wherein:
    the feedwater stream entering the at least one flash tank has a dimensionless feedwater mass flow in a range from 0.5 to 1.75.

12. The process of claim 8 further comprising feeding a digester additive through an additive conduit in fluid communication with the biomass digester.

13. The process of claim 12 wherein the digester additive is methanol.

14. The process of claim 1 further comprising feeding the product stream exiting the first heat exchanger to at least one separator configured to separate the product stream into a liquid stream and a product gas stream.

15. The process of claim 14 further comprising feeding at least a portion of the product gas stream to the heater as a fuel source.

16. The process of claim 1, wherein the first temperature ranges from 350° F. to 800° F.

17. The process of claim 1, wherein the second temperature ranges from 750° F. to 850° F.

18. The process of claim 1, wherein the third temperature ranges from 800° F. to 875° F.

19. The process of claim 1, wherein the fourth temperature ranges from 810° F. to 900° F.

20. The process of claim 1 further comprising feeding fuel to the supercritical water gasification reactor through a fuel conduit in fluid communication with the supercritical water gasification reactor.

21. The process of claim 1 further comprising feeding an oxidizer to the reactor through an oxidizer conduit in fluid communication with the supercritical water gasification reactor.

22. The process of claim 1, wherein the process meets at least one of the following conditions:
(a) wherein the feedwater stream entering the first heat exchanger has a dimensionless mass flow of at least 1.5;
(b) wherein the product stream entering the second heat exchanger has a dimensionless mass flow of at least 1.1; and
(c) wherein the dry basis biomass stream entering the supercritical water gasification reactor has a dimensionless mass flow of at least 0.15.

23. The process of claim 1 further comprising collecting a portion of gases above 3200 pounds per square inch.

24. The process of claim 1, wherein step (v) comprises reacting the feedwater stream provided by the heater with the biomass stream in the supercritical water gasification reactor at a pressure ranging from 4000 psia to 6000 psia.

25. The process of claim 1, wherein fuel is combusted in the heater.

26. The process of claim 25, wherein the fuel is a gas separated from the product stream.

27. The process of claim 1 wherein:
a mass flow of the feedwater stream through the first heat exchanger is in excess of feedwater required by the reactor.

28. The process of claim 1 wherein:
wherein step (iv) further includes exchanging heat, using the third heat exchanger, between the product stream exiting the reactor and the feedwater stream exiting the heater and entering the reactor, using a counter flow arrangement.

29. A process for converting a biomass stream into a product stream comprising hydrogen, methane, and carbon dioxide using a supercritical water gasification reactor, the process comprising:
(i) exchanging heat, using a first heat exchanger, between a feedwater stream and the product stream, wherein the feedwater stream is heated by the product stream to a first temperature;
(ii) feeding the feedwater stream exiting the first heat exchanger to a heater that is configured to heat the feedwater stream from the first temperature to a second temperature;
(iii) exchanging heat, using a second heat exchanger, between the product stream and the feedwater stream exiting the heater, wherein the feedwater stream is heated by the product from the second temperature to a third temperature;
(iv) feeding the feedwater stream exiting the second heat exchanger to the heater, wherein the heater is configured to heat the feedwater stream from the third temperature to a fourth temperature, and exchanging heat, using a third heat exchanger, between the product stream exiting the reactor and the feedwater stream exiting the heater and entering the reactor; and
(v) reacting the feedwater stream provided by the heater with the biomass stream in the supercritical water gasification reactor to produce the product stream, wherein the process uses supercritical water.

30. The process of claim 29, wherein the supercritical water is used in the supercritical water gasification reactor.

31. The process of claim 29 further comprising collecting a portion of gases above 3200 pounds per square inch.

32. The process of claim 29, wherein step (v) comprises reacting the feedwater stream provided by the heater with the biomass stream in the supercritical water gasification reactor at a pressure ranging from 4000 psia to 6000 psia.

33. The process of claim 29, wherein fuel is combusted in the heater.

34. The process of claim 33, wherein the fuel is a gas separated from the product stream.

* * * * *

UNITED STATES PATENT AND TRADEMARK OFFICE
CERTIFICATE OF CORRECTION

| | | |
|---|---|---|
| PATENT NO. | : 12,503,660 B2 | Page 1 of 1 |
| APPLICATION NO. | : 17/636274 | |
| DATED | : December 23, 2025 | |
| INVENTOR(S) | : Thomas J. Baudhuin | |

It is certified that error appears in the above-identified patent and that said Letters Patent is hereby corrected as shown below:

In the Specification

Column 5, Line 10, "Hz" should be --$H_2$--.

Signed and Sealed this
Tenth Day of February, 2026

John A. Squires
*Director of the United States Patent and Trademark Office*